United States Patent
Amsterdam et al.

(10) Patent No.: US 8,671,412 B2
(45) Date of Patent: *Mar. 11, 2014

(54) CALCULATING AND COMMUNICATING LEVEL OF CARBON OFFSETTING REQUIRED TO COMPENSATE FOR PERFORMING A COMPUTING TASK

(75) Inventors: Jeffrey D. Amsterdam, Marietta, GA (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/418,462

(22) Filed: Mar. 13, 2012

(65) Prior Publication Data

US 2013/0247059 A1 Sep. 19, 2013

Related U.S. Application Data

(63) Continuation of application No. 12/257,584, filed on Oct. 24, 2008, now Pat. No. 8,214,841.

(51) Int. Cl.
*G06F 9/46* (2006.01)

(52) U.S. Cl.
USPC .......................................... 718/104; 705/30

(58) Field of Classification Search
None
See application file for complete search history.

(56) References Cited

U.S. PATENT DOCUMENTS

| | | | |
|---|---|---|---|
| 6,732,055 B2 | 5/2004 | Bagepall et al. | |
| 2002/0038235 A1* | 3/2002 | Musafia et al. | 705/11 |
| 2003/0191795 A1* | 10/2003 | Bernardin et al. | 709/105 |
| 2004/0143571 A1* | 7/2004 | Bjornson et al. | 707/3 |
| 2004/0237088 A1* | 11/2004 | Miki et al. | 718/102 |
| 2005/0226163 A1* | 10/2005 | Ramanathan et al. | 370/241 |
| 2005/0231758 A1 | 10/2005 | Reynolds | |
| 2005/0283784 A1* | 12/2005 | Suzuki | 718/100 |
| 2006/0015841 A1* | 1/2006 | Bishop et al. | 717/102 |
| 2006/0089851 A1* | 4/2006 | Silby et al. | 705/1 |
| 2007/0233616 A1 | 10/2007 | Richards et al. | |
| 2007/0250329 A1 | 10/2007 | Richards et al. | |
| 2007/0255457 A1 | 11/2007 | Whitcomb et al. | |
| 2007/0260405 A1 | 11/2007 | McConnell et al. | |

(Continued)

OTHER PUBLICATIONS

Nonfinal Office Action mailed Nov. 9, 2011 for U.S. Appl. No. 12/257,584, filed Oct. 24, 2008.

(Continued)

*Primary Examiner* — Emerson Puente
*Assistant Examiner* — Mehran Kamran
(74) *Attorney, Agent, or Firm* — Patrick J. Daugherty; Driggs, Hogg, Daugherty & Del Zoppo Co., LPA

(57) ABSTRACT

During performance of a specified computing task data concerning resource consumption regarding that specified computing task is gathered and stored. Upon completion of the specified computing task, the amount of carbon offset required to compensate for resource consumption associated with performance of the completed specified computing task is calculated based upon stored or known resource consumption data. The calculated amount of carbon offset information may be transmitted to a carbon offset function provider, and a carbon offset function provider implements the specified amount of carbon offset based upon the calculated amounts communicated for the completed specified computing task.

20 Claims, 2 Drawing Sheets

(56) References Cited

U.S. PATENT DOCUMENTS

| | | | |
|---|---|---|---|
| 2007/0265897 A1 | 11/2007 | McMorris et al. | |
| 2007/0294102 A1 | 12/2007 | McMorris et al. | |
| 2008/0059970 A1 | 3/2008 | Gonen | |
| 2008/0115143 A1* | 5/2008 | Shimizu et al. | 718/105 |
| 2009/0069999 A1* | 3/2009 | Bos | 701/102 |
| 2009/0171722 A1* | 7/2009 | Roberts | 705/7 |
| 2009/0201293 A1* | 8/2009 | Tung et al. | 345/440 |
| 2009/0204916 A1* | 8/2009 | Benedek et al. | 715/764 |
| 2009/0210282 A1* | 8/2009 | Elenbaas et al. | 705/9 |
| 2009/0260014 A1 | 10/2009 | Cameron | |
| 2009/0287806 A1 | 11/2009 | Hamilton et al. | |
| 2009/0292617 A1 | 11/2009 | Sperling et al. | |
| 2009/0313145 A1* | 12/2009 | Hamilton et al. | 705/30 |
| 2009/0316541 A1* | 12/2009 | Takada et al. | 369/47.5 |
| 2010/0050180 A1 | 2/2010 | Amsterdam et al. | |
| 2010/0107171 A1 | 4/2010 | Amsterdam et al. | |
| 2011/0239013 A1* | 9/2011 | Muller | 713/320 |
| 2011/0252248 A1* | 10/2011 | Cameron et al. | 713/300 |
| 2011/0313578 A1* | 12/2011 | Jones et al. | 700/291 |
| 2012/0065805 A1* | 3/2012 | Montalvo | 700/297 |
| 2013/0061207 A1* | 3/2013 | Chamieh et al. | 717/116 |
| 2013/0074077 A1* | 3/2013 | Miller et al. | 718/100 |

OTHER PUBLICATIONS

Response Filed Feb. 9, 2012 to Nonfinal Office Action issued Nov. 9, 2011 for U.S. Appl. No. 12/257,584, filed Oct. 24, 2008.

Notice of Allowance mailed Feb. 24, 2012 for U.S. Appl. No. 12/257,584, filed Oct. 24, 2008.

312 Amendment mailed Feb. 24, 2012 for U.S. Appl. No. 12/257,584, filed Oct. 24, 2008.

U.S. Application of Amsterdam et al, U.S. Appl. No. 12/257,584, filed Oct. 24, 2008.

* cited by examiner

CALCULATING AND COMMUNICATING LEVEL OF CARBON OFFSETTING REQUIRED TO COMPENSATE FOR PERFORMING A COMPUTING TASK

CROSS REFERENCE TO RELATED APPLICATIONS

This application is a continuation of application Ser. No. 12/257,584, filed Oct. 24, 2008 now U.S. Pat. No. 8,214,841.

FIELD OF THE INVENTION

The present invention generally describes a method, system and device for calculating and communicating levels of carbon offset for specific computing tasks and offsetting the resulting environmental impact of performing such tasks.

BACKGROUND OF THE INVENTION

Green computing has been defined as the study and practice of using computing resources efficiently. Typically, technological systems or computing products that incorporate green computing principles take into account economic viability, social responsibility and environmental impact. In particular, green computing includes efforts to obtain maximized energy efficiency from the computer resources being used.

Green computing is also described as the science behind efficient computing and performing tasks on a smaller power budget. All computer usage consumes energy, and depending on the energy source, such usage may also increase greenhouse gas emissions. The United States Government, as well as the information technology industry, recognizes the importance of efficient computing in order to reduce greenhouse gas emissions resulting from energy or power consumption. Large government and commercial initiatives are underway to identify environmentally conscious information technology programs and the most efficient computers.

In addition to using energy efficient computers and computing programs to perform computing tasks using a smaller power budget, carbon offsetting has also become a popular method to address environmental concerns. Carbon offsetting is generally referred to as the act of mitigating, or offsetting, greenhouse gas emissions. Carbon offsetting enables mitigation of current or future greenhouse gas emissions through a variety of methods. The planting of trees has become one of the better known examples of compensating for greenhouse gas emissions resulting from personal air travel.

Companies and organizations are known to specialize in the performance of carbon offsetting functions or operations. These companies and organizations initiate carbon offsetting operations after individuals make financial contributions or companies sign contracts to pay for offsetting operations. However, these efforts are independent of, and not responsive to, actual amounts of carbon offset required as indicated by the actual usage of computing resources required to perform specific computing tasks. Neither has prior carbon offsetting permitted a computer user to participate in determining levels of carbon offsetting desired to compensate for greenhouse gas emissions used in the performance of computing tasks.

SUMMARY OF THE INVENTION

Methods are provided for calculating a level or amount of carbon offset in compensation for performance of a computer task or specific computer usage. Methods include gathering and storing resource consumption data related to the embarking, performance and completion of a specified computing task. Amount of carbon offset required to compensate for resource consumption associated with performance of the completed specified computing task are calculated as a function of stored resource consumption data, and calculated amounts of carbon offset are transmitted to a carbon offset function provider. Carbon offset functions are thus implemented based upon calculated amounts of carbon offset for completed specified computing tasks.

In another aspect, service methods are provided comprising deploying applications for calculating a level or amount of carbon offset in compensation for performance of a computer task or specific computer usage according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for calculating a level or amount of carbon offset in compensation for performance of a computer task or specific computer usage. Moreover, systems, articles and programmable devices configured for performing one or more method and/or process elements of the current invention are also provided, configured to calculate a level or amount of carbon offset in compensation for performance of a computer task or specific computer usage, for example as described above.

BRIEF DESCRIPTION OF THE DRAWINGS

These and other features of the methods, systems and devices for carbon offsetting will be more readily understood from the following detailed description of the various aspects of the embodiments taken in conjunction with the accompanying drawings in which.

Figure 1:
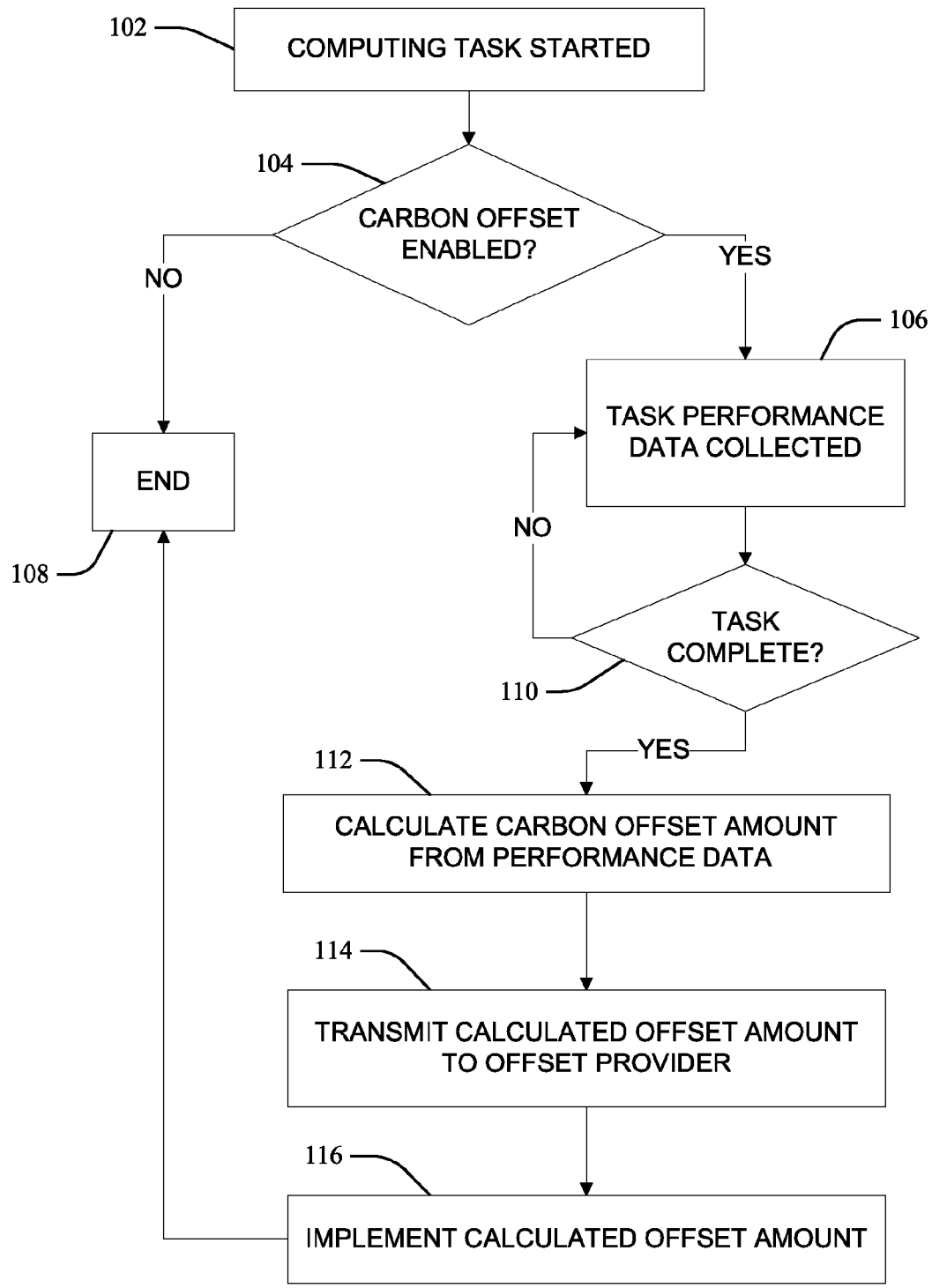
FIG. 1 is a flow chart illustrating a method and system for invoking carbon offsetting computing according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description; and
II. Computerized Implementation

I. General Description

Carbon offset computing, or a carbon offsetting method, system and device, may be defined as one that calculates and communicates levels or amounts of carbon offset required to compensate for greenhouse gas emissions generated in connection with specific computing tasks. The amount of carbon offset may be calculated based upon a number of inputs, including the level of carbon offset desired by the user. According to the present invention a resulting carbon offset may then be communicated as a desired carbon offset function to compensate for the environmental impact, or greenhouse gas emissions, resulting from performance of the specific computing tasks or use of the specific computing resources.

More particularly, FIG. 1 illustrates a method or system according to the present invention for enabling a computer user to calculate the carbon offset which would be required as a direct result of the computer user's performance of a specified computer processing task. At 102 a specified computing task is embarked upon or otherwise initiated. If at 104 carbon offsetting processes are enabled, then resource consumption metrics and/or other data related to the specified computing task is gathered and stored at 106 (else the process ends at 108). Resource consumption metrics and/or data continues to be collected and stored by looping back to 106 during the performance of the specified computing task until the task is completed as determined at 110. An amount of carbon offset required to compensate for resource consumption associated with performance of the completed specified computing task is then calculated at 112 as a function of stored resource consumption data, and the calculated amount of carbon offset is transmitted to a carbon offset function provider at 114. One or more carbon offset functions are then implemented at 116 based upon the amount of carbon offset calculated at 112 for the completed specified computing task, the process ending at 108.

To use current computer systems in an efficient manner requires general energy management and increasing knowledge with respect to the use of local and network available technological resources. A server farm housing computers that serve internet web pages may have large power needs, and information technology ecosystems create an array of complexities, ranging from data center to client computing and from customer impacts to business impacts, with many investment and process decisions involving the trade off of energy savings for performance. Given these interdependencies and complexities, green computing processes are still evolving to meet desired levels of performance.

Green computing solutions will likely evolve differently for every computer situation. Difficulties with such different solutions arise in individual computer energy management, for example, a laptop with a high resolution video display may require a more expensive battery technology if weight is to be maintained as well as battery life. While less expensive battery use may result in the laptop being more energy-efficient, for example in CPU and hard drive processing, the performance of the CPU and hard drive may be so much lower as to be undesirable to or unworkable for the computer user and the particular computing task to be performed. As a result, energy efficiency may be desired, but difficult to achieve, using low performance equipment and technology. Methods and systems according to the present invention enable a computer user to obtain a desired end result of offsetting greenhouse gas emissions generated during a specified computer processing task by using a method of carbon offset directly related to the computer processing tasks performed.

Methods, systems and devices according to the present invention provide for calculating the level or amount of carbon offset which would be required to compensate for performance of a computer task or specific computer usage, communicating the level or amount of carbon offset for such specific computing tasks or usage, and offsetting the resulting environmental impact of such tasks or usage as may be indicated by the computer user by a carbon offset function or operation. These methods, systems and devices may calculate carbon offset calculations deriving carbon offset amounts proportional to the energy or resources consumed in performance of the computer task or computer usage, providing users with the ability to favor computing tasks that consume less energy resources and thereby resulting in a smaller global environmental impact from such computing tasks.

Carbon offset computing according to the present invention comprehends a number of inputs or data points to calculate the actual carbon offset associated with a specific computational task or computer usage. Such inputs may be selected by a computer user or automatically required in connection with performance of certain computer tasks. To determine the actual carbon offset associated with a specific computing task inputs are collected from the start of the computing task through its completion. The inputs for the computing task are collected from metrics both internal and external to the computing task. For example, such inputs may include: the degree of carbon offsetting desired; power consumption; time of day; geographic location; level of network usage; heat generated; and paper printed. Additionally, such inputs may include a percentage of the infrastructure supporting the devices executing the computing task. For example, a percentage may be calculated based on a data center's energy use for lighting, temperature control, backup devices, monitoring devices, staff devices, and other devices that consume energy, wherein the calculated percentage is the execute time of the task divided by the execute time for all tasks on all devices in the data center, multiplied by the total energy costs of the infrastructure.

In some embodiments desired carbon offsets are calculated based upon inputs collected and stored during performance of a specified computer task. Once calculated, the carbon offset data may then be communicated to a designated commercial carbon offset provider for implementation. The carbon offset provider performs the desired carbon offset function or operation based upon the carbon offset data provided. Such a commercial provider may be a company that plants trees for carbon sequestration or that makes technological investments intended to reduce emissions or that transfers funds in a carbon offset credit or debit transaction. In some embodiments inputs collected and stored during performance of the specified computer task are transmitted to another party for calculation, which may be the carbon offset function provider, or a party having further information to be applied to the calculation of the amount of carbon offset.

In some embodiments a computer user may participate in and specify a percentage or amount of carbon offsetting or mitigation desired in connection with performance of a specific computer task. For example, a device may include a computer graphical user interface which, once enabled or utilized by the user, performs the carbon offset calculation based upon the specific settings provided by the user for performance data collection at 106 (FIG. 1) and/or for calculating the amount of carbon offset at 112. Illustrative but not exhaustive setting examples include general sets of settings (e.g. three selectable "low conservation," "medium conservation" and "high conservation" settings), as well as more specific or rigorous user-defined specifications. Formulas or policy tables may also be used to map the carbon offsetting intent of the user to actual amounts of carbon offset required to compensate for the computing tasks performed.

Based upon the specific metrics or other data associated with a specified computer processing task a computer user may determine a level of carbon offset desired, and provide the desired carbon offset amount to a commercial offset provider so that the carbon offset functions may be performed. For example, the greenhouse gas emissions resulting from the performance of the computer processing task may be offset by the planting of a specific number of trees or other plant materials or sponsorship or funding of other energy friendly initiatives.

Figure 2:
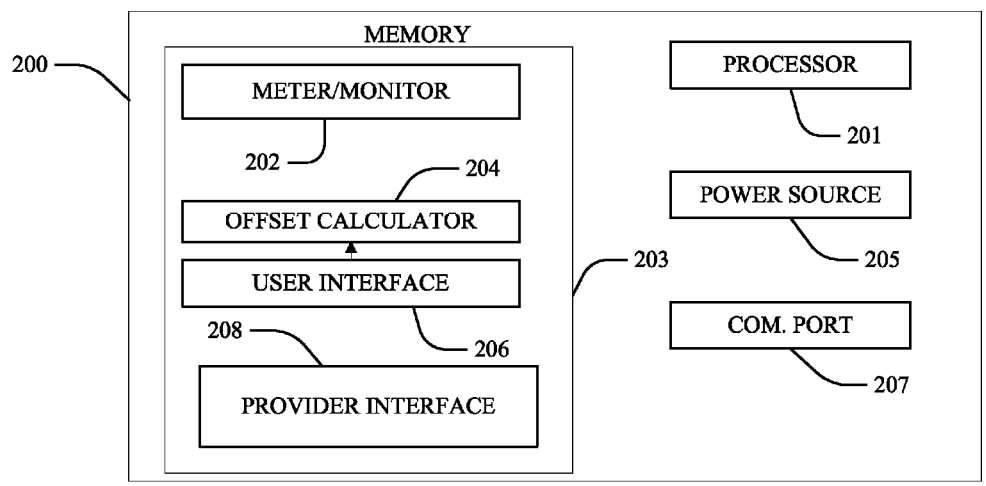
FIG. 2 is a block diagram of a programmable device configured to calculate carbon offsetting for a computing task according to the present invention.

FIG. 2 illustrates a programmable device or module 200 configured to calculate a level or amount of carbon offset in compensation for performance of a computer task or specific computer usage according to the present invention. The device 200 may be incorporated into a large system wherein other components of the system accomplish systems and methods according to the present invention, or it may be a stand-alone device or module configured to perform each of the processes and methods of the present invention, for example as discussed above with respect to FIG. 1. The present embodiment comprises a central processing unit (CPU) or other processing means 201 in communication with a memory 203, the memory 203 comprising logic components that enable the CPU 201 to perform processes and methods according to the present application. The memory 203 comprises logic components configured to perform the processes discussed above, including those described with respect to FIG. 1, including a power consumption or usage calculator/monitor/meter logic component 202 configured to directly measure or obtain performance data relative to a specified task; a carbon offset amount calculator level device interface logic component 204 configured to calculate an amount of carbon offset required to compensate for resource consumption associated with performance of a specified computing task as a function of stored resource consumption data; a user interface logic component 206 configured to enable a user to provide specific settings for performance data collection and/or for calculating carbon offsets according to the present invention; and a provider interface logic component 208 configured to transmit amounts of carbon offset calculated according to the present invention to, or to otherwise communicate with, a carbon offset function provider. A power unit 205 is configured to provide operative power to the device 200; examples include battery units 205 and power inputs configured to receive alternating or direct current electrical power, and other appropriate power units 205 will be apparent to one skilled in the art. A communication port or network link/node means 207 is also provided and configured to enable network and other communications with users, other devices, and offset, systems, monitoring, administrative and service provider entities, as well as others as appropriate.

Some embodiments may implement user interface component 206 inputs through an additional button, slider, rocker switch or dial on a computer system or computer system keyboard, whereupon actuation of such a button, etc. by a user causes a process or system according to the present invention to collect energy usage or carbon emission data using the power consumption monitor component 202 related to the computer processing task being performed, and further once a computer processing task is completed collected carbon emission data is used to calculate the amount of carbon offset required with respect to the specific completed computer processing task. Other embodiments may invoke additional or subsequent initiations or inputs (e.g. button depressions) in order to consider the amount of greenhouse gas emission consideration the specific computer user desires to compensate, for example, 100% or a lesser percentage may be desired and initiated through a one or more button inputs. A button may also indicate a desired percentage or desired green state. Sliders or dials may enable a user to select a level of carbon offset desired; in some examples a switch may be numbered lowest to highest, as correlated to a largest amount of carbon offset to fully compensate for the computing task performance. Other embodiments may enable user inputs through programs and applications installed on a computational device, for example through graphical user interface (GUI) inputs and displays using desktop icons, a system tray icons or application menus, and further wherein upon invocation a menu display may permit a user to select details for the energy conservative state or enter the conservative states and settings directly.

In some examples according to the present invention, prior to performance of the specified computer processing task, a query may be made regarding whether it is desired to enable the carbon offsetting system. Methods and systems may include the ability of a computer system administrator as well as a computer user to specify carbon generating performance parameters desired to be included or excluded with respect to the company's network, internet activity or local computer equipment used to perform a specific computing task. Users/administrators/etc. may thus use a device interface to select or specify the possible carbon offset level, further wherein offset levels are displayed to the user for selection. In one embodiment desired carbon offset levels displayed to a user may be generated by querying a policy look up table containing possible computational device resource considerations.

Once performance of the specified computer processing task is completed, the desired carbon offset information may thus be calculated based upon the collected stored data. For example, a look up table may be used which contains comparative information regarding the amount of carbon offset required to compensate for the greenhouse gas emissions generated as a result of the specific computer performance and energy consumption levels collected and stored during the specific computer processing task. Alternatively, third party or service provider business emission calculators may be consulted for additional comparative information concerning carbon offset calculations; in one embodiment third party calculators may be used via a web service provided by the third party, or a hypertext markup language (HTML) form filler or parser may be used/created to interact with the third party calculator.

The carbon offset functions performed at a level selected may also be displayed for the user. Examples of third party providers available to implement desired emission reduction measures or functions include the Climate Trust organization and NativeEnergy, Inc., both of the United States. Such third party providers are available to implement emission reductions based upon a variety of commercial relationships or contractual agreements, which may be arranged in advance by the system administrator or individually by the computer user. Additional third party providers of such services, both within and outside of the United States, are also appropriate for use with the present invention, as will be appreciated by one skilled in the art, in particular as the goal of obtaining carbon neutrality continues to expand on a global basis.

II. Computerized Implementation

Figure 3:
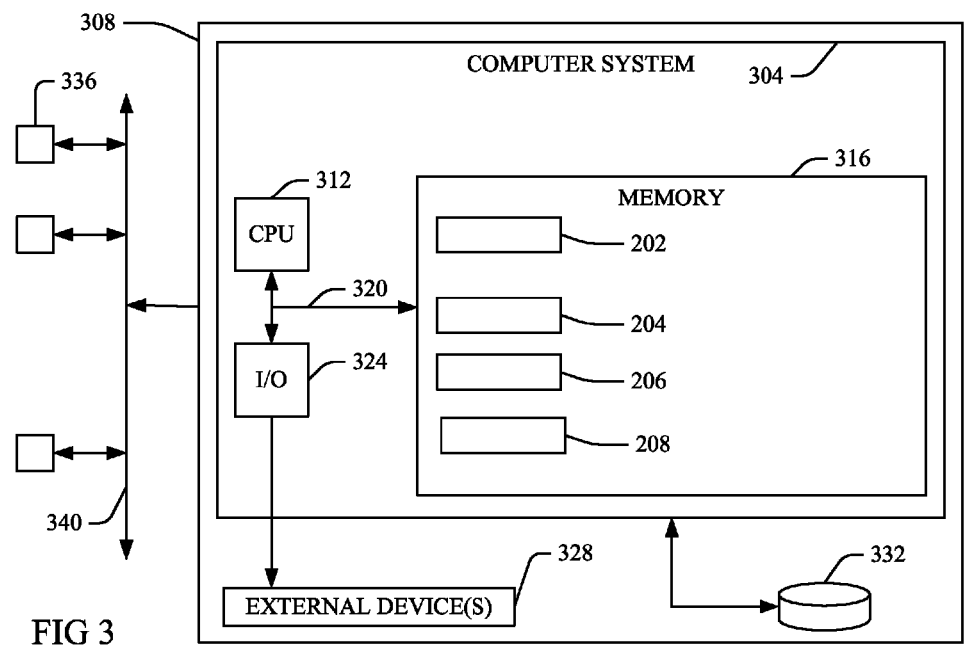
FIG. 3 is a block diagram illustrating a computerized implementation of a process for carbon offsetting for a computing task according to the present invention.

Referring now to FIG. 3, an exemplary computerized implementation of a process for calculating carbon offset in compensation for performance of a computer task or specific computer usage according to the present invention is provided, including a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-2 and described above, including the monitor/meter logic component 202, the carbon offset amount calculator logic component 204, the user interface logic component 206 and the provider interface logic component 208 discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1 and 2 above and described otherwise herein. To this extent, the computer-readable/useable medium includes program code that implements each of the various process steps of the present application.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for carbon offset computing, the method comprising:
    determining via a processor a resource consumption amount associated with performing a specified computing task by a computational device in part by using the execution time required for the completion of that task within a data center; and
    the processor calculating an amount of carbon offset required to compensate for the determined resource consumption amount that is associated with the performance of the specified computing task by the computational device as a function of stored resource consumption data by:
    invoking a carbon offset level in response to a selection via an interface of the computational device prior to the performance of the processing task by the computational device;
    querying a policy table containing a plurality of possible computational device resource considerations as a function of invoked carbon offset level;
    displaying an available subset of the plurality of possible carbon offset levels to a user as a function of the querying of the policy table;
    implementing at least one of the available subset possible carbon offset levels for the computational device to perform the specified processing task in response to a selection of the implemented at least one possible carbon offset levels; and
    displaying a carbon offset function as a function of the at least one selected carbon offset level.

2. The method of claim 1, further comprising:
    determining an infrastructure percentage value by dividing an execute time required for the computational device to perform and complete the specified computing task within a data center infrastructure by a total execute time for all tasks on all of a plurality of data center energy-consuming devices within the data center;
    determining a total of all energy costs of the data center as a total of energy use costs for each of a plurality of data center lighting, temperature control, backup and monitoring devices that consume energy within the data center; and
    determining the resource consumption amount associated with the performing of the specified computing task by the computational device as a product of multiplying the determined infrastructure percentage value by the total of all energy costs of the data center.

3. The method of claim 2, further comprising:
    transmitting the calculated amount of carbon offset to a carbon offset function provider for implementing a carbon offset function based upon the calculated amount of carbon offset for the completed specified computing task.

4. The method of claim 2, further comprising:
    determining the resource consumption amount associated with the performing of the specified computing task as a function of measuring a change in an internal temperature of the computational device performing the specified computing task during the performing of the task.

5. The method of claim 2, further comprising:
    determining the resource consumption amount associated with the performing of the specified computing task as a function of determining a time of day and an external environmental temperature during which the specified computing task is being performed.

6. The method of claim 2, further comprising determining the resource consumption amount associated with the performing of the specified computing task as a function of:
    determining a geographic location where the specified computing task is being performed; and
    determining at least one of a form of power generation provided at the geographic location, an excess power capacity at the geographic location, an external environmental temperature at the geographic location and a proximity of the geographic location to another computer network to which connection is required.

7. The method of claim 2, further comprising:
    determining the resource consumption amount associated with the performing of the specified computing task as a function of measuring a level of power consumption required by the computational device to perform the specified computing task.

8. The method of claim 2, further comprising:
    determining the resource consumption amount associated with the performing of the specified computing task as a function of determining how many pages of paper were printed during performance of the specified computing task.

9. An article of manufacture, comprising:
    a physical computer-readable tangible storage device having computer readable program code embodied therewith, the computer-readable program code comprising instructions which, when executed on a computer system processing unit, cause the computer system processing unit to:
    determine a resource consumption amount associated with performing a
    specified computing task by a computational device in part by using the execution time required for the completion of that task within a data center; and
    calculate an amount of carbon offset required to compensate for the determined resource consumption amount associated with the performance of the specified computing task by the computational device as a function of stored resource consumption data by:

invoking a carbon offset level in response to a selection via an interface of the computational device prior to the performance of the processing task by the computational device:

querying a policy table containing a plurality of possible computational device resource considerations as a function of invoked carbon offset level;

displaying an available subset of the plurality of possible carbon offset levels to a user as a function of the querying of the policy table;

implementing at least one of the available subset possible carbon offset levels for the computational device to perform the specified processing task in response to a selection of the implemented at least one possible carbon offset levels; and displaying a carbon offset function as a function of the at least one selected carbon offset level.

10. The article of manufacture of claim 9, the program code comprising instructions which, when executed on the computer system processing unit, further cause the computer system processing unit to:

determine an infrastructure percentage value by dividing an execute time required for the computational device to perform and complete the specified computing task within a data center infrastructure by a total execute time for all tasks on all of a plurality of data center energy-consuming devices within the data center;

determine a total of all energy costs of the data center as a total of energy use costs for each of a plurality of data center lighting, temperature control, backup and monitoring devices that consume energy within the data center; and determine the resource consumption amount associated with the performing of the specified computing task by the computational device as a product of multiplying the determined infrastructure percentage value by the total of all energy costs of the data center.

11. The article of manufacture of claim 10, the program code comprising instructions which, when executed on the computer system processing unit, cause the computer system processing unit to transmit the calculated amount of carbon offset to a carbon offset function provider for implementing a carbon offset function based upon the calculated amount of carbon offset for the completed specified computing task.

12. The method of claim 10, the program code comprising instructions which, when executed on the computer system, cause the computer system to determine the resource consumption amount associated with the performing of the specified computing task as a function of measuring a change in an internal temperature of the computational device performing the specified computing task during the performing of the task.

13. A method for providing a service for carbon offsetting for a computational device performing specific computational tasks, the method comprising:

providing a processing unit that when executing program instructions stored on a tangible computer-readable storage device via a memory:

determines a resource consumption amount associated with performing a specified computing task by a computational device; and calculates an amount of carbon offset required to compensate for the determined resource consumption amount associated with the performance of the specified computing task by the computational device as a function of stored resource consumption data by;

invoking a carbon offset level in response to a selection via an interface of the computational device prior to the performance of the processing task by the computational device;

querying a policy table containing a plurality of possible computational device resource considerations as a function of the invoked carbon offset level;

displaying an available subset of the plurality of possible carbon offset levels to a user as a function of the querying of the policy table;

implementing at least one of the available subset possible carbon offset levels for the computational device to perform the specified processing task n response to a selection of the implemented at least one possible carbon offset levels; and displaying a carbon offset function as a function of the at least one selected carbon offset level.

14. The method of claim 13 wherein the processing unit further:

determines an infrastructure percentage value by dividing an execute time required for the computational device to perform and complete the specified computing task within a data center infrastructure by a total execute time for all tasks on all of a plurality of data center energy-consuming devices within the data center:

determines a total of all energy costs of the data center as a total of energy use costs for each of a plurality of data center lighting, temperature control, backup and monitoring devices that consume energy within the data center; and determines the resource consumption amount associated with the performing of the specified computing task by the computational device as a product of multiplying the determined infrastructure percentage value by the total of all energy costs of the data center.

15. The method of claim 14 wherein the processing unit further transmits the calculated amount of carbon offset to a carbon offset function provider for implementing a carbon offset function based upon the calculated amount of carbon offset for the completed specified computing task.

16. The method of claim 14, wherein the processing unit further determines the resource consumption amount associated with the performing of the specified computing task as a function of measuring a change in an internal temperature of the computational device performing the specified computing task during the performing of the task.

17. A system, comprising:

a processing unit;

a tangible computer-readable storage device in communication with the processing unit;

and a memory in communication with the processing unit;

wherein the processing unit, when executing program instructions stored on the tangible computer-readable storage device via the computer readable memory:

determines a resource consumption amount associated with performing a specified computing task by a computational device in part by using the execution time required for the completion of that task within a data center; and calculates an amount of carbon offset required to compensate for the determined resource consumption amount associated with the performance of the specified computing task by the computational device as a function of stored resource consumption data by:

invoking a carbon offset level in response to a selection via an interface of the computational device prior to the performance of the processing task by the computational device;

querying a policy table containing a plurality of possible computational device resource considerations as a function of invoked carbon offset level;

displaying an available subset of the plurality of possible carbon offset levels to a user as a function of the querying of the policy table;

implementing at least one of the available subset possible carbon offset levels for the computational device to perform the specified processing task in response to a selection of the implemented at least one possible carbon offset levels; and displaying a carbon offset function as a function of the at least one selected carbon offset level.

18. The system of claim 17, wherein the processing unit, when executing the program instructions stored on the tangible computer-readable storage device via the computer readable memory, further:

determines an infrastructure percentage value by dividing an execute time required for the computational device to perform and complete the specified computing task within a data center infrastructure by a total execute time for all tasks on all of a plurality of data center energy-consuming devices within the data center;

determines a total of all energy costs of the data center as a total of energy use costs for each of a plurality of data center lighting, temperature control, backup and monitoring devices that consume energy within the data center; and determines the resource consumption amount associated with the performing of the specified computing task by the computational device as a product of multiplying the determined infrastructure percentage value by the total of all energy costs of the data center.

19. The system of claim 18, wherein the processing unit, when executing the program instructions stored on the tangible computer-readable storage device via the computer readable memory, further transmits the calculated amount of carbon offset to a carbon offset function provider for implementing a carbon offset function based upon the calculated amount of carbon offset for the completed specified computing task.

20. The system of claim 18, wherein the processing unit, when executing the program instructions stored on the tangible computer-readable storage device via the computer readable memory, further determines the resource consumption amount associated with the performing of the specified computing task as a function of measuring a change in an internal temperature of the computational device performing the specified computing task during the performing of the task.

* * * * *